UNITED STATES PATENT OFFICE.

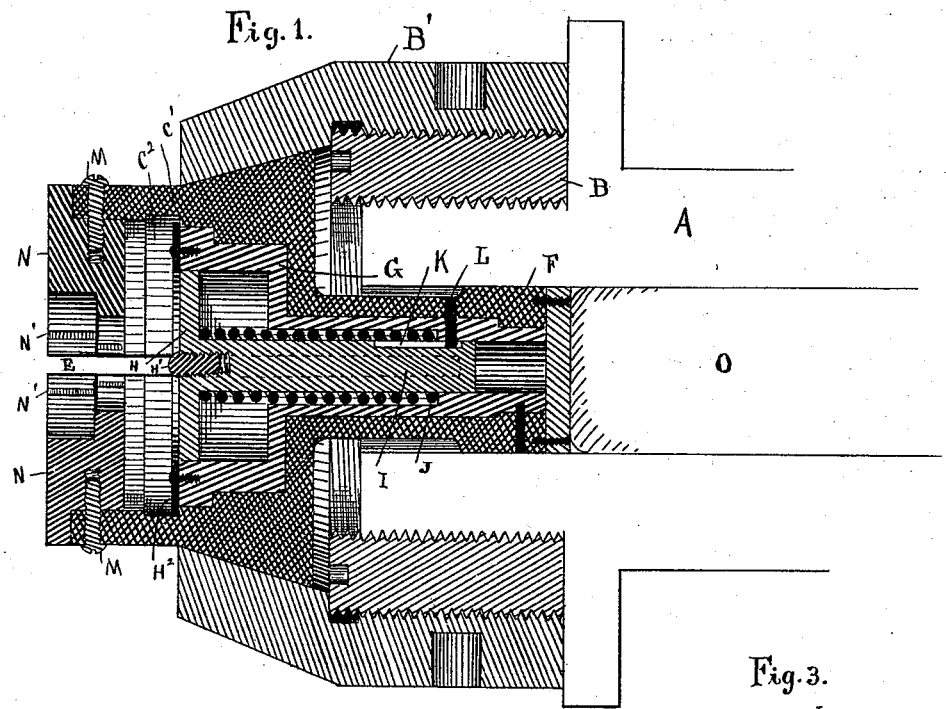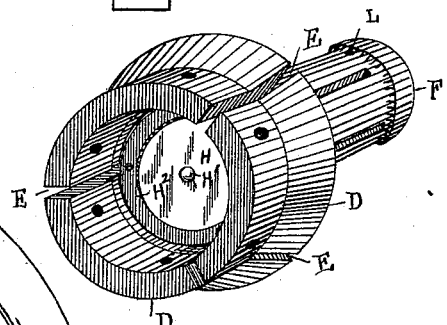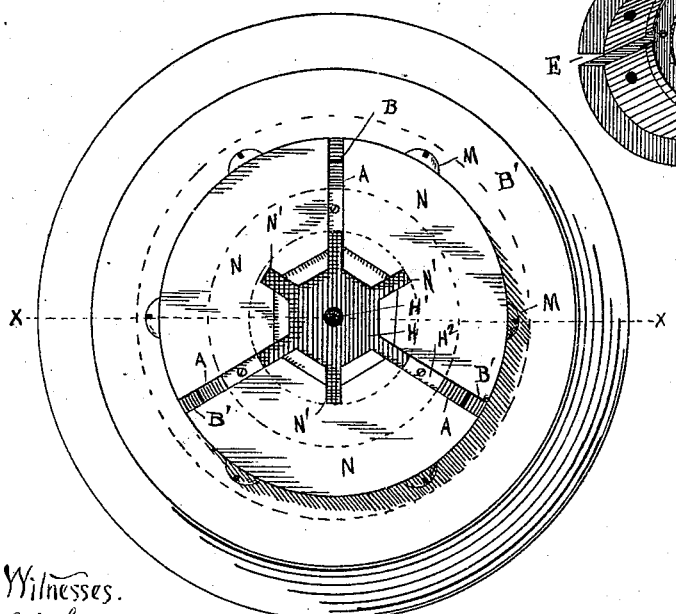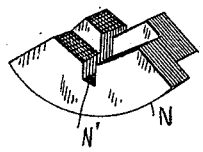

FERDINAND J. FELDT, OF PEORIA, ILLINOIS.

LATHE-CHUCK.

SPECIFICATION forming part of Letters Patent No. 516,645, dated March 20, 1894.

Application filed August 16, 1893. Serial No. 483,276. (No model.)

*To all whom it may concern:*

Be it known that I, FERDINAND J. FELDT, a citizen of the United States, residing at Peoria, in the county of Peoria and State of Illinois, have invented certain new and useful Improvements in Lathe-Chucks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in lathe chucks.

The object of the invention is to provide a chuck which shall be simple in construction, effective in its work and easy of manipulation; and furthermore the object is to provide a chuck which shall deliver all turnings or filings from its interior which are continually accumulating therein and that the jaws of chuck shall be set out and away from the chuck proper to facilitate work.

In the drawings presented herewith, Figure 1 represents a sectional longitudinal view of the chuck through line $xx$ Fig. 2. Fig. 2 is a face or front view of the chuck. Fig. 3 is a perspective view of a jaw holder used in the chuck and Fig. 4 is a perspective view of one of the jaws.

In the several figures A represents a lathe shaft or spindle having its engaged portion threaded on its periphery which takes a supplemental collar B threaded internally and externally and which engages the outer shell or collar B'. The bore of the shell or collar B' is tapered from the inside, forward of the collar B, to its outer face, and the tapering head of a cylindrical jaw holder occupies a position within said shell B', and is substantially of the form shown in Fig. 3 and consists of three or more spring-tongues D separated by the radial longitudinal slots E but united at their rear ends as at F as shown. Within the larger bore of this cylinder, which has three or four different bores, is located a shouldered piston cylinder G also having different sized bores. Within the larger bore of the piston cylinder G is a sliding piston head H having a piston rod I made therewith, which occupies a smaller bore of the said cylinder. The piston rod I is surrounded by an opening spiral spring J one end of which bears against the piston head H and the opposite end against a shoulder formed between two of the bores of the cylinder. The piston rod I is provided with a slot K near its rear end and a screw L is let through the jaw cylinder and the said tube or cylinder G into said slot. It will at once be seen that said screw L securely holds the two cylinders together and at the same time limits the longitudinal movement of the piston. The jaws N, of the chuck may now be described, one of which is shown in Fig. 4 in perspective. This jaw fits within the tongue D as shown in Fig. 1, the ends of which are flush with the slots E between the said tongues D, and screws M serve to hold them in place. Midway between the ends of these jaws on the inner chucking face may be cut a channel N' for convenience in holding the work. It will be seen that the neck or smaller diameter of the cylindrical jaw holder fits within the bore of the lathe spindle A and a shifting pressure bar O abuts against said end of the jaw cylinder. This is to operate the chuck. The use of the supplemental threaded collar B is, that any size chuck may be readily put upon the lathe by having the threaded bore of the shell B' always the same size as the said supplemental collar B.

The operation of the chuck may be understood from the following: The parts being placed in the several positions shown and desiring to chuck a piece of work to be bored or turned off, it is placed within the jaws N and the pressure bar O is caused to be thrust against the jaw holder and this movement drives the said holder forward forcing the tapering portion of the tongues D against the tapering portion of the shell or collar B' causing the jaws to approach the center and grip the work firmly.

As before stated the chuck is intended to discharge all accumulations from its interior made by the cutting tool or from other causes, and to accomplish this, the before described piston H is provided.

Now when any waste material falls within the chuck, it falls out between the tongues D of the jaw holder cylinder through the slots E for the reason, that the chucking parts proper are outside of the remainder of the device and the material may easily escape. When the tool whether drill or boring tool, passes up to and against the piston head H which it sometimes does, it presses the said head inward and when withdrawn the head regains its normal position by reason of the spring J and this ejects all turnings which may have accumulated during that work; so that the tool may pass far into the interior of the chuck without leaving any trouble behind, when withdrawn. That the head H may not be injured when this operation takes place, a hardened steel tip H' is secured in the face of the head for the tool to strike against. A flat ring $H^2$ is secured to the end face of the piston head cylinder G and slightly overhangs the shoulder C' turned in the jaw holder cylinder. Thus the turnings are prevented from getting back through the slots E to the rear of the chuck.

The interior of the jaw cylinder is counter-bored at $C^2$ to form a recess in which to allow the turnings to accumulate and sift therefrom through the slots E. The ring $H^2$ is made somewhat smaller than this recess $C^2$ so that the parts will not come in contact with said ring in any of the positions.

In all chucks of this class, the clamping jaws are within the chuck body so that it is very inconvenient in many ways and it is impossible to rid the chuck of the turnings, but the chuck herein described is designed to do away with all these objections completely and will be appreciated by all workmen.

I claim—

1. In a lathe chuck a cylindrical spring-tongue jaw holder having a tapering head adapted to be inclosed and engaged by a cylindrical shell or collar having a tapering bore to correspond with said tapering headed jaw holder, said shell or collar having a threaded bore to engage with a supplemental collar having an internal and external thread substantially as set forth and for the purposes described.

2. In a chuck for lathes, a cylindrical spring-tongue jaw holder bored and counter-bored and having located therein a shouldered cylinder bored and counter-bored to receive a piston adapted to have a reciprocating movement therein and actuated by a spring, said piston being controlled in its said movement by suitable means substantially as set forth and for the purposes herein described.

3. In a chuck for lathes a cylindrical spring-tongue jaw holder comprising the spring-tongues D separated by the slots E but united at their rear ends as at F, said jaw holder being bored and counter-bored to receive a shouldered piston cylinder G secured therein by suitable means, a piston adapted to slide within said cylinder G and actuated by a spring K and a flat ring $H^2$ secured to the face of the cylinder G substantially as set forth and described and for the purposes specified.

4. In a lathe chuck a cylindrical spring-tongue jaw holder bored and counter-bored to receive the piston cylinder G and having a second larger bore C' forward of the said cylinder G for the purposes set forth.

5. A lathe chuck comprising the cylindrical spring-tongue jaw holder provided with the jaws N, said jaw holder being bored and counter-bored to receive the shouldered piston cylinder G having the piston and piston head I and H respectively retained therein, the outer shell B' inclosing the said jaw holder, and the supplemental internally and externally threaded collar B to secure the chuck to the lathe spindle substantially as set forth and for the purposes described.

6. In a lathe chuck, the combination of the cylindrical jaw holder, piston cylinder G, piston and piston head I and H held by the screw L the spring K surrounding said piston I, the flat ring $H^2$ secured to the face of the piston cylinder G, the jaws N secured to the outer extremities of the jaw holder tongues D, the shell B' surrounding the jaw holder cylinder, and the supplemental collar B to secure the chuck to the lathe spindle substantially as set forth and described.

In testimony whereof I affix my signature in presence of two witnesses.

FERDINAND J. FELDT.

Witnesses:
C. JOHNSON,
ARTHUR KEITHLEY.